United States Patent [19]

Spencer

[11] 4,385,727
[45] May 31, 1983

[54] IRRIGATION EMITTER TUBE

[76] Inventor: Lloyd Spencer, 220 Patrician Way, Pasadena, Calif. 91105

[21] Appl. No.: 199,524

[22] Filed: Oct. 22, 1980

Related U.S. Application Data

[63] Continuation-in-part of Ser. No. 45,781, Jun. 5, 1979, abandoned, which is a continuation of Ser. No. 911,187, May 31, 1978, abandoned, which is a continuation of Ser. No. 729,038, Oct. 4, 1976, abandoned, which is a continuation-in-part of Ser. No. 570,382, Apr. 22, 1975, Pat. No. B570,382.

[51] Int. Cl.³ ............................................. B05B 15/02
[52] U.S. Cl. ..................................... 239/107; 239/542
[58] Field of Search ................................. 239/106–109, 239/111, 533.13, 542, 547, 570–572; 138/40, 42, 43, 46; 405/39, 40, 43–45, 48

[56] References Cited

U.S. PATENT DOCUMENTS

| | | | |
|---|---|---|---|
| 3,292,378 | 12/1966 | Rosenthal et al. | 239/547 X |
| 3,333,422 | 8/1967 | Neyland | 239/547 X |
| 3,767,124 | 10/1973 | Spencer | 239/542 |
| 3,777,980 | 12/1973 | Allport | 239/542 X |
| 3,779,468 | 12/1973 | Spencer | 239/542 |
| 3,797,754 | 3/1974 | Spencer | 239/542 |
| 3,807,430 | 4/1974 | Keller | 239/542 X |
| 3,870,236 | 3/1975 | Sahagun-Barragan | 239/542 |
| 3,874,597 | 4/1975 | Stephens et al. | 239/542 |
| 3,917,169 | 11/1975 | Harmony | 239/107 |
| 4,009,832 | 3/1977 | Tiedt | 239/542 |
| 4,210,287 | 7/1980 | Mehoudar | 239/542 |

Primary Examiner—Johnny D. Cherry

[57] ABSTRACT

An irrigation emitter tube having, when free of pressure a pair of wall portions, one wall portion being essentially flat between its margins, the other also being essentially flat except for an outwardly arched longitudinally extending portion, the lateral margins of the wall portions being joined by semi-circular portions of low radius; the emitter tube, when subject to internal pressure, being expansible into essentially cylindrical contour, the radius of which is essentially identical to the radius of the arched portion; that is, the curvature of the arched portion remains essentially constant from zero to maximum pressure. The arched portion is provided with a series of emitter ports and the internal surfaces of the arched portion surrounding the ports are utilized by the valve elements to form at a predetermined low pressure a series of flush flow discharge passages and to form at a greater pressure a series of drip flow discharge passages.

13 Claims, 27 Drawing Figures

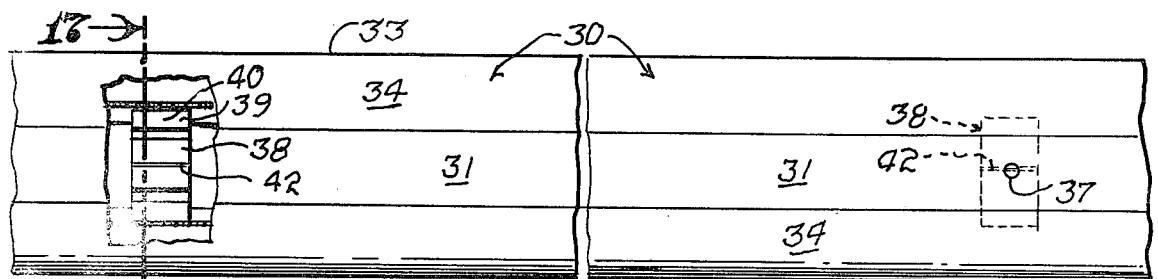
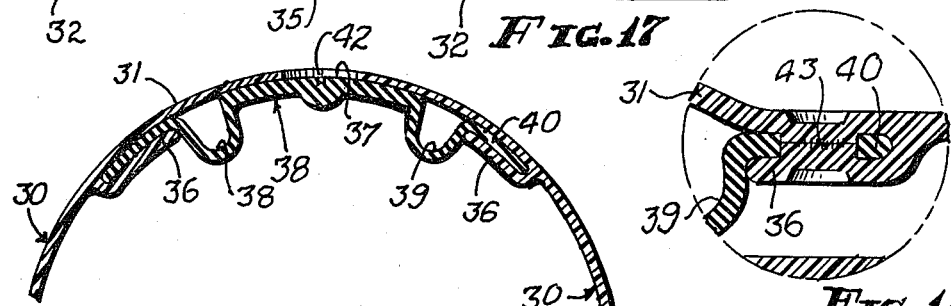
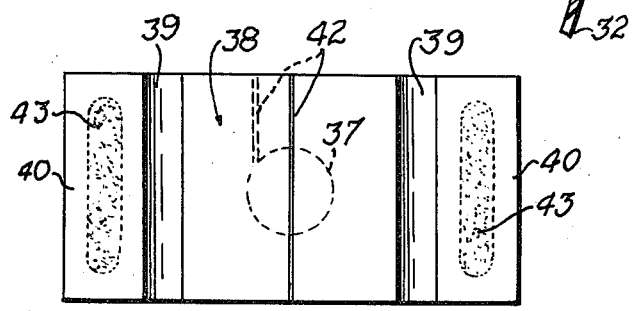
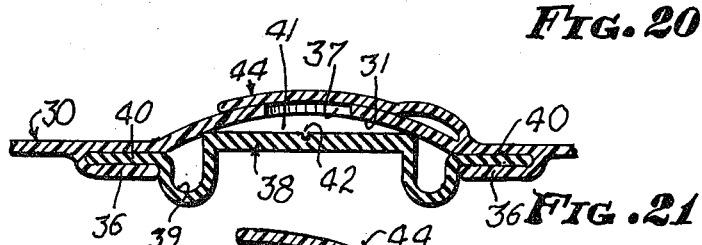
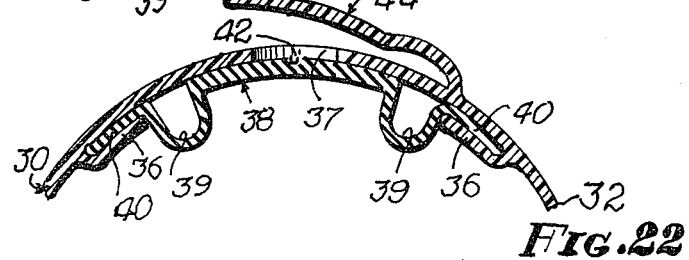

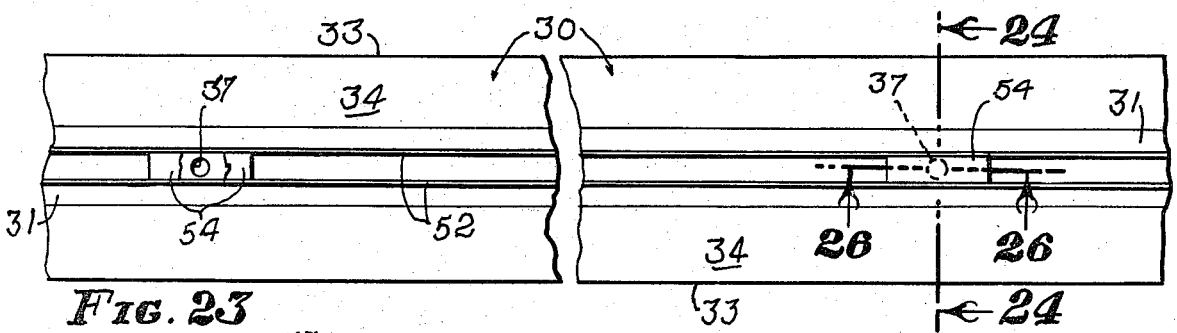
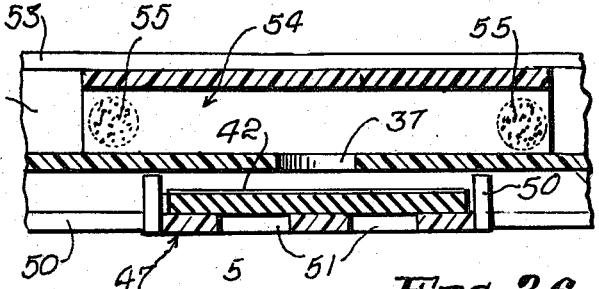
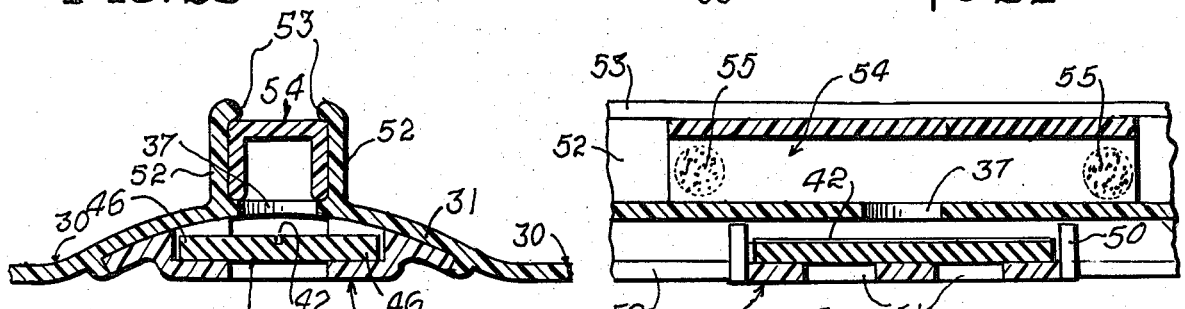
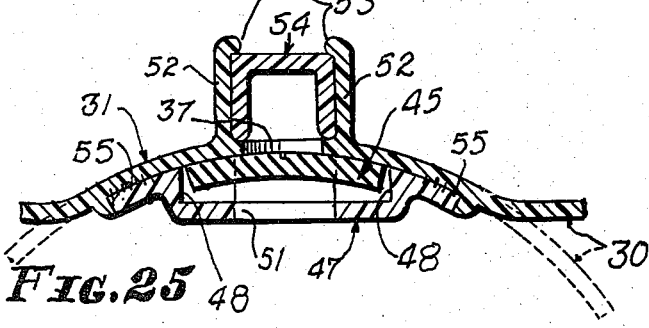
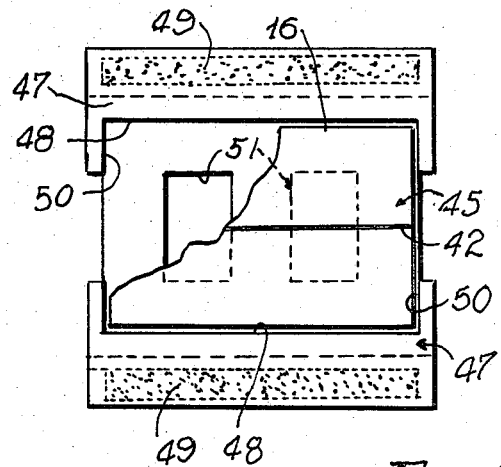

IRRIGATION EMITTER TUBE

BACKGROUND AND SUMMARY

This invention is related to the inventions disclosed in U.S. Pat. Nos. 3,779,468 and 3,797,754 and is a continuation-in-part of my previous application for IRRIGATION EMITTER TUBE, Ser. No. 045,781, filed June 5, 1979, now abandoned, which application is a continuation of my earlier application, Ser. No. 911,187, filed May 31, 1978, now abandoned, which is a continuation of my application, Ser. No. 729,038, filed Oct. 4, 1976, now abandoned, which is a continuation-in-part of my application, Ser. No. 570,382, filed Apr. 22, 1975, now U.S. published application No. B570,382, published Apr. 13, 1976.

The present invention is summarized in the following objects:

First, to provide an irrigating emitter tube which has, when free of internal pressure, a flat contour except for a longitudinally extending arched portion, and is expandable, when pressurized, to a cylindrical contour the radius of which is essentially identical to the radius of the arched portion; the arched portion being pierced and receives a series of emitter elements utilizing the interior surface of the arched portion to form at a selected low pressure, a series of flush flow discharge passages and to form with the arched surface at a higher pressure a series of drip flow passages.

Second, to provide an irrigation emitter tube, wherein the emitter tube is formed from a web of flexible plastic material which is rolled to form circumferentially overlapping bands joined and bonded by a heat seal, a portion of the web continuing circumferentially within the tube to form a flow control strip, segments of which form with the confronting wall of the emitter tube, a series of flush flow and drip flow passages communicating with emitter outlets formed in the tube.

Third, to provide an irrigation emitter tube, formed in the manner indicated in the preceding object, wherein separate flow control strips are attached to the web prior to being formed into a tube.

Fourth, to provide an irrigation emitter tube, as indicated in the preceding objects, wherein an external strip extends circumferentially over the emitter tube outlets to form a cover closing the emitter outlets, when the emitter tube is in its essentially flat condition, the cover strip being forced away from the emitter outlets, as the walls of the emitter curve toward a cylindrical profile on being pressurized.

DESCRIPTION OF THE FIGURES

FIGS. 16 through 22 show a further embodiment of the irrigation emitter tube, in which:

FIG. 16 is an approximately full size side view of the emitter tube in its low pressure flush flow condition with a portion broken away to show internal elements.

FIG. 17 is an enlarged transverse sectional view thereof taken through 17—17 of FIG. 16, also showing the emitter tube in its low pressure flush flow condition, which is also its flat condition for storage.

FIG. 18 is a further enlarged sectional view taken within Circle 18 of FIG. 17.

FIG. 19 is a fragmentary sectional view corresponding to FIG. 17, the emitter tube being shown in its pressurized cylindrical condition for drip flow.

FIG. 20 is an enlarged plan view of an emitter plate.

FIG. 21 is an enlarged fragmentary sectional view corresponding to FIG. 17, showing an emitter shut-off valve in its position closing access to an emitter.

FIG. 22 is a fragmentary sectional view corresponding to FIG. 21, showing the emitter shut-off valve in its open condition, permitting outlet flow.

FIGS. 23 through 27 show a further embodiment of the irrigation emitter tube, in which:

FIG. 23 is a fragmentary approximately full size side view of the emitter tube in its low pressure flush flow condition.

FIG. 24 is an enlarged transverse sectional view taken through 24—24 of FIG. 23, also showing the emitter tube in its low pressure flush flow condition.

FIG. 25 is a view similar to FIG. 24, showing the emitter tube in its pressurized cylindrical condition for drip flow.

FIG. 26 is an enlarged fragmentary longitudinal sectional view taken through 26—26 of FIG. 23 showing the emitter in its drip flow condition.

FIG. 27 is an enlarged exposed view of the radially outward surface of the emitter plate and its retainer frame.

DETAILED DESCRIPTION

Figure 1:
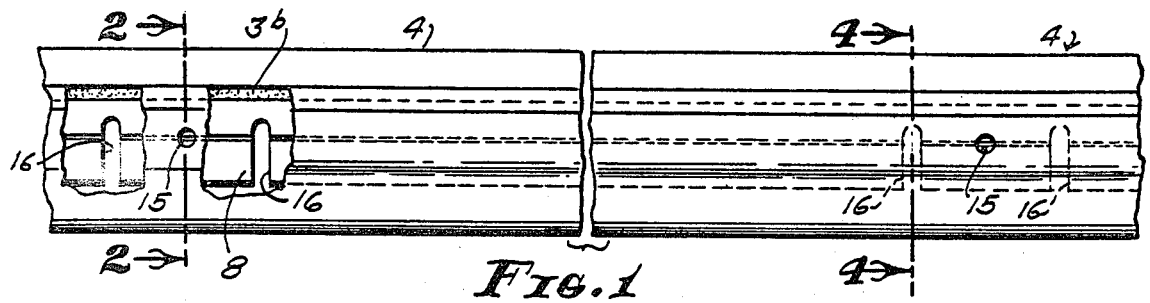
FIG. 1 is an approximately full size fragmentary side view of one embodiment of the irrigation emitter tube.

The irrigation emitter tube, of which several embodiments are shown, is, in each embodiment formed from a web extrusion 1, the pattern of which varies. In each case however, the extruded web includes longitudinally extending outer and inner seam bands 2a and 2b, a margin of one of the seam bands forming an edge of the web; the other seam band being located inwardly from the margin of the web and forming a positioning shoulder 3a. To form the emitter tube the web is rolled into an essentially cylindrical shape with the seam bands 2a and 2b in circumferentially overlapping relation and the bands are then heat sealed and bonded as indicated by 3b. This may be accomplished essentially in the manner disclosed in U.S. Pat. No. 2,491,048.

In the embodiments shown in FIGS. 1 through 7, the web 1 forms an emitter tube 4 which, after forming, may be heat pressed to provide opposed essentially flat sides 5 and 6 joined by folded edge margins 7. Extending circumferentially from the inner seam band 2b is a flow control strip 8 which confronts the wall 5. The confronted portion of the wall 5 is transversely arched as indicated by 9 in FIG. 2, or the flow control strip 8 may be arched as indicated by 10 in FIG. 6. In either case the free margin of the flow control strip 8 engages the wall 5, and the edge of the strip 8 is provided with a longitudinal bead 11 for sliding contact with the wall 5, and the confronting portions of the wall 5 and flow control strip 8 form a flush flow passage 12.

The flow control strip 8 is intended to collapse against the wall 5 and is provided with a small longitudinal channel 13 which, when covered by the wall 5, forms a drip flow passage. A wall thickness compensating rib 14 overlies the channel 13.

It should be noted that the web 1 and the resulting emitter tube 4 may be quite thin, as thin as 0.010 inches (0.0254 cm) if a low flow pressure is maintained. A wall dimension of 0.30 inches (0.762 cm) for moderate flow pressures, and as much as 0.050 inches (0.127 cm). In most instances a low to moderate flow pressure is desired.

The method of manufacture and operation of the embodiments shown in FIGS. 1 through 6 is as follows:

The web 1, as extruded, includes the flow control strip 8. Prior to forming the emitter tube 4, a series of emitter outlets 15 are punched in the web 1. The locations of the outlets are calculated to be centered with respect to the drip flow channel 13, when the emitter tube 4 is formed. Also the flow control strip is provided at equal longitudinally offset locations with transverse slots which form emitter inlet openings 16.

Figure 3:
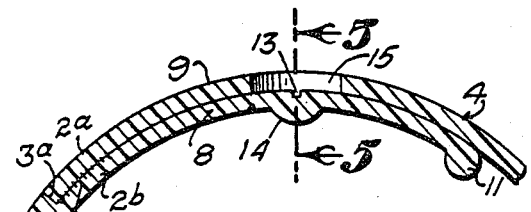
FIG. 3 is a fragmentary transverse sectional view corresponding to FIG. 2, showing the emitter tube in its drip flow condition.
Figure 4:
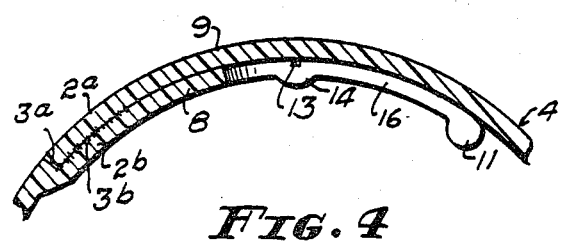
FIG. 4 is a fragmentary transverse sectional view taken through 4—4 of FIG. 1, also showing the emitter tube in its drip flow condition.

When water is first supplied to the flattened emitter tube, water enters the pairs of flush flow passages 12 to produce an initial flushing action for each emitter opening 15. As the emitter tube expands toward a cylindrical shape water pressure causes the short sections of the flow control strip between the pairs of inlet slots 16 to snap into contact with the wall 5 to produce drip flow through the channel 13 to emitter outlets 15 as indicated in FIGS. 3 and 4. When the water is shut off, the emitter tube returns to its initial flat contour and the arched portions 9 and 10 snap back to their initial contour causing a final flushing action.

Figure 2:
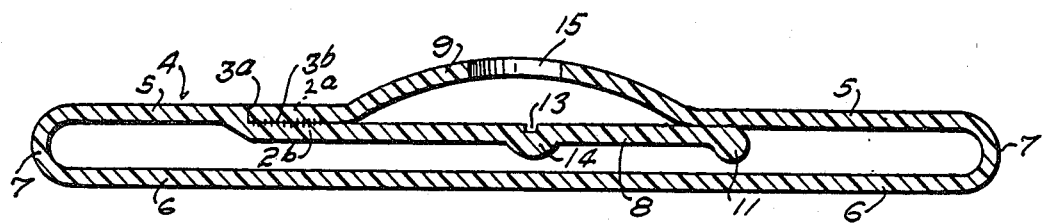
FIG. 2 is an enlarged transverse sectional view thereof in its unpressurized condition.
Figure 6:
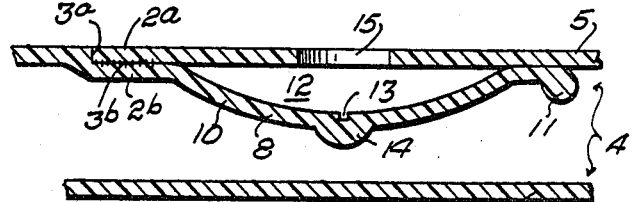
FIG. 6 is a fragmentary transverse sectional view of the emitter tube corresponding to FIG. 2 showing a modification thereof.
Figure 7:
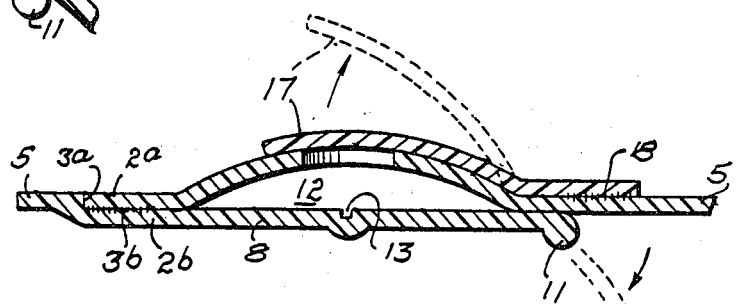
FIG. 7 is a fragmentary sectional view corresponding to FIG. 2, showing an external cover strip, indicating by solid lines the cover strip in its closed condition and by broken lines in its open condition.
Figure 5:
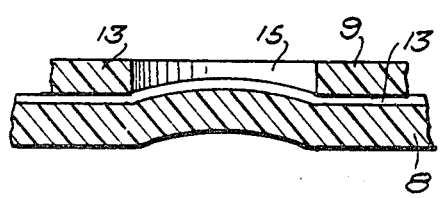
FIG. 5 is a further enlarged fragmentary sectional view taken through 5—5 of FIG. 3.
Figure 8:
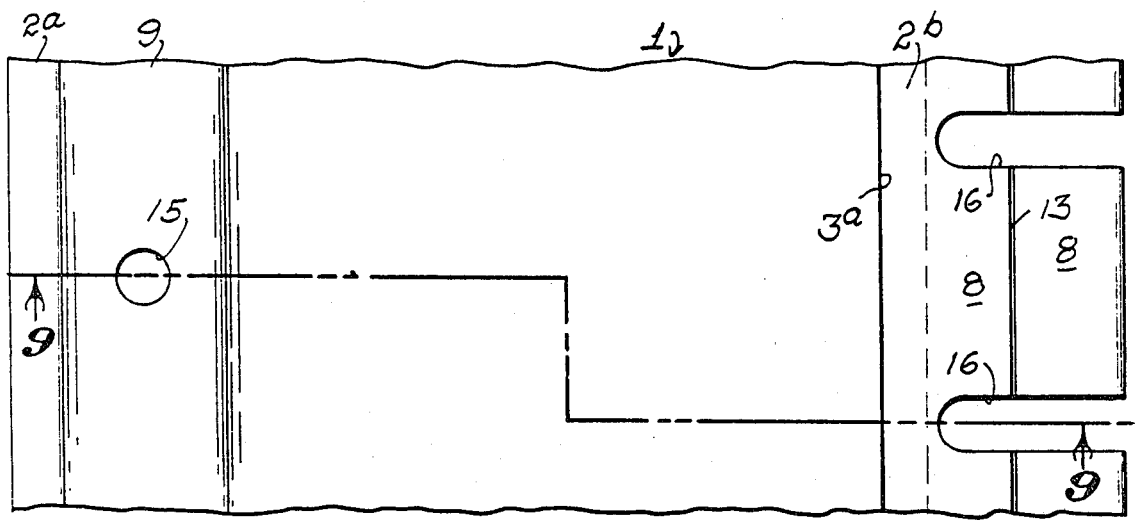
FIG. 8 is an enlarged fragmentary side view of a web member prior to being formed into an emitter tube.
Figure 9:
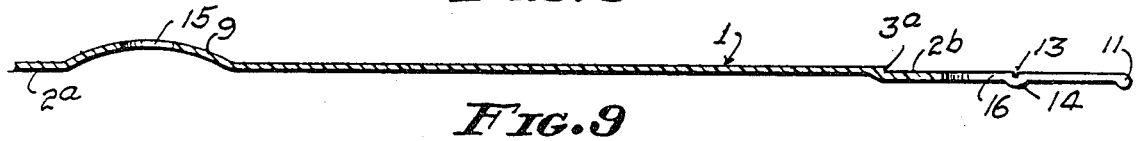
FIG. 9 is a sectional view thereof taken through 9—9 of FIG. 8.

Referring to FIG. 7, a cover strip 17 conforming to the wall 5 in the region of the emitter outlets 15 may be bonded by one margin to the wall 5, as indicated by 18, so that when the emitter tube 4 is in the condition shown in FIGS. 2 or 6, the cover strip closes the outlets. However, when the emitter tube changes shape in response to water pressure, the cover strip pivots clear of the opening as indicated by broken lines.

It should be noted that due to the initially flat condition of the emitter tube, the initial rise in water pressure is more rapid than is the case with a cylindrical tube; thus, tending to reduce the number of emitters in flush flow and permits a greater number of emitters for a given size of emitter tube. In this regard reference is made to U.S. Pat. No. 3,779,468. A necessary factor is to choose a plastic material having a high degree of flexibility coupled with a good "memory," or ability to return to its initial shape. Also, conversion from flush to drip flow at reduced pressure is aided by reducing the thickness of the flow control strip 8. This can be accomplished without excessive protrusion into the outlet 15 by use of a compensating rib 14 of appropriate dimension.

Figure 10:
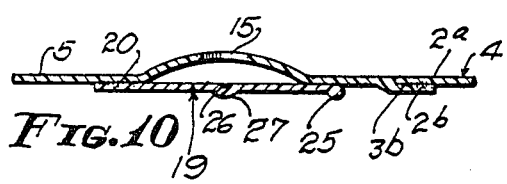
FIG. 10 is an enlarged fragmentary transverse sectional view taken through 10—10 of FIG. 11 showing another embodiment of the emitter tube in its unpressurized condition.
Figure 12:
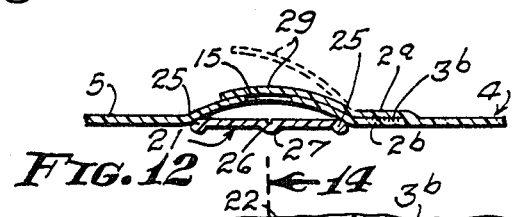
FIG. 12 is an enlarged fragmentary transverse sectional view taken through 12—12 of FIG. 13 showing a further embodiment of the emitter tube in its unpressurized condition and indicating a cover strip in its closed condition by solid lines and in its open position by broken lines.
Figure 11:
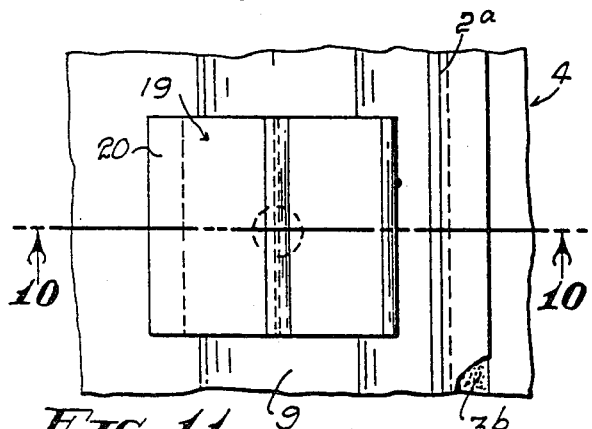
FIG. 11 is a fragmentary internal view of the embodiment shown in FIG. 10.
Figure 13:
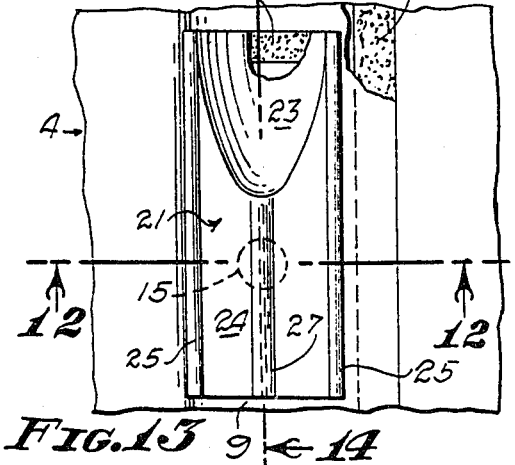
FIG. 13 is a fragmentary internal view of the embodiment shown in FIG. 12.
Figure 14:
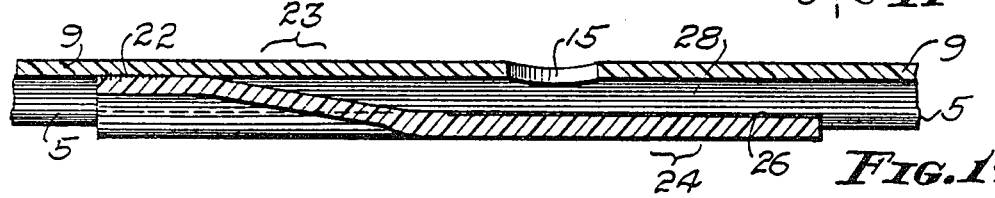
FIG. 14 is a further enlarged fragmentary longitudinal sectional view taken through 14—14 of FIG. 13 showing an emitter in its flush condition.
Figure 15:
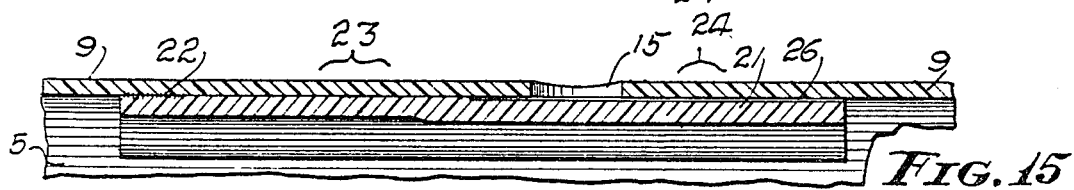
FIG. 15 is a fragmentary longitudinal sectional view corresponding to FIG. 14, showing the emitter in its drip flow condition.

Referring to FIGS. 10 and 11, in place of an integral flow control strip, a separate flow control strip 19 may be used for each outlet. A series of relatively short strips may be bonded at one margin, as indicated by 20. The strips may have the same transverse profile as the strip 8, and may be extruded or molded. Use of separate strips 19 increase the choice of materials that may be used, such as a material having higher elasticity and lower hardness than the walls of the emitter tube 4.

Referring to FIGS. 12 through 15, another embodiment of a separate flow control strip is indicated by 21. The flow control strip 21 is intended to be molded, and includes a bonded end 22 conforming to the profile of the confronting portion of the wall 5. Extending from the bonded end is a transition portion 23. Continuing from the transition portion is a flow control portion 24, having marginal beads 25, and a central drip flow channel 26, backed by a compensating rib 27. The flow control portion 24 forms with the confronting portion of the wall 5 a single flush flow passage 28 communicating with a corresponding emitter outlet 15.

Illustrated in conjunction with the embodiment shown in FIGS. 10 through 15, is a cover strip 29 similar to the cover strip 17, except that it is integral with the emitter tube 4; that is, initially a part of the web 1.

Referring to the embodiment shown in FIGS. 16 through 22, the emitter tube 30 has a profile similar to the emitter tube previously described; more specifically, the emitter tube includes an arch 31 corresponding to the arch 9 of the emitter tube 1, and coplanar flat portions 32 joined by low radius lateral margins 33 corresponding to margins 7. The margins 33 are joined to a second pair of coplanar webs 34. As access to the interior of the tube is required, the webs 34 may initially extend in angular relation as suggested by broken lines in FIG. 17. The webs are joined by a heat seal 35 between overlapping edge portions of the webs.

As noted in regard to the previous embodiments, the emitter tube 30 is formed of thin high strength flexible plastic material capable, when pressurized, to assume a cylindrical profile. When the emitter tube 30 is depressurized, which is the condition shown in FIG. 17, the radius of the arch 31 approximates the radius of the cylindrical tube profile. Thus, as indicated in regard to the other embodiments, the profile of the arch remains essentially constant. Disposed within the emitter tube 30 immediately beyond the lateral margins of the arch 31, are longitudinally extending opposed retainer webs 36 forming continuous slots bordering the arch 31.

The arch 31 is provided with a series of emitter ports 37 each covered internally by an emitter plate 38. Each peripheral edge of each emitter plate is bordered by a pair of hollow peripherally expansible and contractable channels 39 and a pair of tabs 40 received in the retainer webs 36.

When the emitter tube 30 is at essentially zero pressure, as shown in FIG. 16, each pair of channels 39 and tabs 40 positions the two edges of the emitter plate 38 joined thereto in touching or close proximity to the arch 31 so as to form with the arch 31 diametrically disposed flush flow passages 41 causing the water to mutually impinge and discharge at reduced velocity through the corresponding emitter port 37.

The emitter plate 38 is provided with a drip flow channel 42 extending longitudinally with respect to the emitter tube and diametrically with respect to the emitter outlet. The drip flow channel 42 may be diametrically disposed and coextensive with the flush flow passage to mutual impingement to reduce velocity, or a single radial drip channel may be provided. Also the drip channel may be tangentially disposed with respect to the emitter port 37, as indicated by 42a to effect velocity reduction.

Spacing of the emitter ports and assembly of the emitter plates 38 are accomplished before the webs 34 are joined by the heat seal 35. Also, the tabs 40 are heat sealed as indicated by 43. Joined adjacent one margin of the arch 31 is a continuous valve strip 44 which is responsive to angular movement between the web 34 and arch 31. The valve strip 44 extends over the emitter ports 37 closing the ports 37 against entry or dirt or entry of small insects between operation of the emitter. Initial operation of the emitter lifts the valve strip as indicated in FIG. 22.

Reference is now directed to FIGS. 23 through 27 which utilizes the emitter tube 31. In place of the emitter plate 38, a modified emitter plate 45 is utilized in which the channels 39 and tabs 40 are omitted. The emitter plate 45 is essentially flat and includes a pair of peripherally spaced edges 46. Under zero or flush flow condition, the emitter plate 45 is retained in loosely confronting relation to the arch 31 by a frame 47 so as to form between the emitter plate 45 and arch 31 a flush flow passage. On drip flow internal pressure forces the emitter plate 45 against the arch 31 to form therewith a drip flow channel 42.

The frame 47 includes peripherally spaced flanges 48 which confront the peripheral portions of the arch and are joined thereto by heat seals 49. The ends of the frame extend peripherally forming stops 50 to prevent longitudinal displacement of the emitter plate 45. The frame 47 is provided with openings 51 to permit circulation of water around the emitter plate 45 in response to water pressure so that flush flow and drip flow occurs as needed.

As provided in the other embodiments illustrated, the arch 31 is provided with suitably spaced emitter ports 37. Each emitter plate 45 is centered with respect to the corresponding port 37. In the embodiment shown in FIGS. 23 through 27, each port 37 is located between a pair of longitudinally extending flanges 52 having at their extremities inturned retainer ribs 53. The pair of flanges 52 receive therebetween a series of channel members 54 which are pressed in place for retention by the ribs 53. A channel member 54 is centered over each emitter port 37, and deflects the water in opposite directions. To maintain the channel members in place, their end portions may be heat sealed as indicated by 55.

I claim:

1. An irrigation emitter tube, comprising:
   a. a continuous flexible flow tube normally flat except for a longitudinally extending arched portion, the tube expansible in response to internal water pressure toward an essentially cylindrical configuration;
   b. the flow tube having a series of aligned outlets;
   c. a longitudinally extending internal strip attached to the flow tube at one margin, its opposite margin being unattached, a surface of the strip being in confronting relation to the inner surface of the arched portion;
   d. the internal strip including a portion covering at least one of the outlets and having at least one inlet spaced therefrom;
   e. the confronting surfaces of the internal strip and flow tube defining a flush flow passage connecting each inlet and corresponding outlet;
   f. one wall surface of each flush flow passage having a drip channel;
   g. the internal strip being collapsible under relatively low water pressure into surface contact with the flow tube thereby confining flow to the corresponding drip channel.

2. An irrigation emitter tube, as defined in claim 1, wherein:
   a. the attached margin of the internal strip is an axially extending margin thereof.

3. An irrigation emitter tube as defined in claim 1, wherein:
   a. the attached margin of the internal strip is a peripherally extending margin thereof.

4. An irrigation emitter tube, as defined in claim 1, wherein:
   a. the internal strip and its attached margin extends longitudinally past a plurality of outlets and the inlets are slots traversing the internal strip, a pair of inlet slots being disposed in axially opposite directions with respect to each outlet in close relation thereto as compared to the spacing between the outlets.

5. An irrigation emitter tube, as defined in claim 1, wherein:
   a. an external cover strip is connected to the emitter tube by one longitudinal margin and extends over the outlets;
   b. the cover strip initially closes the outlets and is caused to lift clear of the outlets as the tube flexes outwardly on initial expansion of the tube toward its cylindrical configuration.

6. An irrigation emitter tube, as defined in claim 5, wherein:
   a. the tube includes circumferentially overlapping longitudinally extending internal inner and outer bonded zones, the internal strip is on integral relation with the inner bonded zone and the cover strip is integral with the outer bonded zone and extends circumferentially therefrom.

7. An irrigation emitter tube, as defined in claim 1, wherein:
   a. the internal strip is divided longitudinally into a series of spaced strip elements and the inlets to the drip channel are formed at least at one end of each strip element.

8. An irrigation emitter tube, comprising:

a. a continuous flexible flow tube having, under essentially zero pressure, opposed continuous flat side portions joined by folded portions of low radius;

b. one of the flat sides interrupted by an inwardly concave arched portion;

c. the flow tube, when pressurized, assuming a cylindrical configuration, the radius of which approximates the radius of the arched portion whereby the contour of the arched portion remains essentially constant during and between irrigation cycles;

d. a series of emitter outlets disposed along the arched portion;

e. a corresponding series of emitter units communicating between the interior of the flow tube and the outlets;

f. each emitter unit movable relative to the surface area of the arched portion around an outlet and cooperating with the surface area to form below a preselected flow tube pressure, a flush flow passage; and to form above a preselected flow tube pressure, a drip flow passage.

9. An irrigation emitter tube, as defined in claim 8 wherein:

a. a longitudinally extending internal strip is attached to the flow tube along one margin, its opposite margin being unattached, a surface of the strip is in confronting relation to the inner concave surface of the arched portion;

b. the strip is provided with pairs of transverse slots longitudinally spaced with respect to the corresponding emitter outlets;

c. the portions of the strip between the transverse slots thereby forming said emitter units.

10. An irrigation emitter tube, as defined in claim 8, wherein:

a. each emitter unit includes an elastomeric emitter plate overlying an emitter outlet and having a drip flow channel, peripherally spaced margins engageable with the arched portion, each plate spaced apart from its associated emitter outlet, to provide the flush flow passage and cooperating with the arched portion to define a drip flow passage when the plate is in surface contact with the arched portion.

11. An irrigation emitter tube, as defined in claim 8, wherein:

a. each emitter unit includes an elastomeric emitter plate having a drip flow channel in the face that is positioned in confronting relation to a corresponding emitter outlet, the drip flow channel extending beyond the margins of the emitter outlet; and b. a frame for the plate, the frame being attached to the flow tube in the arched portion and restraining the emitter plate in close proximity to the emitter outlet to permit movement of the emitter plate between positions effecting flush flow and drip flow.

12. An irrigation emitter tube, as defined in claim 8, wherein:

a. the flow tube has internally a pair of longitudinally extending retainer webs bordering the arched portion;

b. the emitter unit includes an emitter plate having a drip channel and peripherally extending tabs received and secured in the webs.

13. An irrigation emitter tube, comprising:

a. a continuous flexible flow tube assuming a cylindrical configuration when pressurized for irrigation, and a flat condition when depressurized except for a longitudinally extending arched portion, the arched portion retaining an essentially constant radius whether the flow tube is pressurized or depressurized; said arched portion having a series of emitter outlets;

b. an elastomeric emitter plate positioned internally of each emitter outlet and extending longitudinally over the inner surface of the arched portion to form therewith below a preselected pressure a flush flow passage between the interior of the tube and the corresponding emitter outlet; and to form therewith above a preselected pressure a drip flow passage with the plate mating with the surface of the arched portion around the corresponding emitter outlet.

* * * * *